Oct. 31, 1967    J. BABOZ    3,349,491
PHOTOGRAMMETRIC PLOTTER
Filed June 11, 1964    5 Sheets-Sheet 1

Oct. 31, 1967  J. BABOZ  3,349,491
PHOTOGRAMMETRIC PLOTTER
Filed June 11, 1964  5 Sheets-Sheet 4

United States Patent Office 3,349,491
Patented Oct. 31, 1967

3,349,491
PHOTOGRAMMETRIC PLOTTER
Jean Baboz, Paris, France, assignor to Societe d'Optique et de Mecanique de Haute Precision, Paris, France, a company of France
Filed June 11, 1964, Ser. No. 374,301
Claims priority, application France, June 19, 1963, 938,645
7 Claims. (Cl. 33—20)

ABSTRACT OF THE DISCLOSURE

A photogrammetric plotter uses two photographs taken from two different viewpoints having sight marks combined with the photographs and has two rods embodying the homologous space image rays. Each rod is articulated at a fixed point embodying one of the viewpoints by two cardans whose centers coincide with the fixed point. A main cradle is mounted on the frame of the machine and the two primary axes of the two cardans associated with each rod are supported by the main cradle. The main cradle pivots on the frame about a horizontal axis passing through the center of the cardans and perpendicular to the primary axis of the first cardan and intersects this axis. The corresponding photograph is disposed in a plane perpendicular to the horizontal pivot axis of the cradle. Movement of the corresponding rod produces relative displacement of the corresponding photograph in its plane with respect to the corresponding sight mark.

---

This invention relates to a photogrammetric plotter of the type used to determine the forms of an object and, for example, terrain from two photographs of such object taken from two different viewpoints.

Machines of this kind can be used more particularly for map making from aerial photographs of the surface of the earth.

The invention relates more particularly to plotters of the rod type, wherein the homologous space image rays are embodied by a pair of rods each pivoted about a stationary point representing the viewpoint.

In machines of this kind, the photographs must be placed in orientable planes so that the photographs can be given the inclination they had when taken and as the rods move about image point centres representing the viewpoints, the said rods either move the photographs with respect to a stationary sight or part of the sight with respect to the stationary photographs. Irrespective of the method chosen, the sight must enable the photographs to be viewed in variable-orientation planes, and this leads to complex constructions.

To simplify the sight system it is therefore advantageous to use means intended to keep the photographs in a fixed plane independent of the relative orientation of the photographs on taking.

French Patent No. 970,860, filed by P. Poivilliers on August 26, 1948 under the title "Plotting Process and Apparatus" and French Patent No. 1,124,187 filed by the Societe d'Optique et de Mecanique de Haute Precision, on March 29, 1955, under the title "Photogrammetric Plotter" describe such means for this purpose, the first being mechanical and the second optical.

The present invention relates to a mechanical solution whereby the photographs can be kept in fixed planes during the relative orientation (formation of the model).

By comparison with the arrangement described in the Patent No. 970,860, the present invention has the advantage of eliminating the band connection provided for introduction of the transverse (or tilt) inclination of the photograph.

It also has the advantage that it can be used for a machine in which the photograph carriage dimensions and hence weight are reduced, this having a favourable effect on increased accuracy, since the forces on the rods are reduced during their exploratory plotting or tracing movements, and the system simplifies the balancing problems arising out of the variations in the inclination to the horizontal of the directions of the displacements of the photograph carriages.

Finally, as will be indicated hereinafter, the splitting up of the rotations of each rod about its viewpoint into a rotation of two bars about right-angled axes reduces the attack angles of the bars and corresponding carriages when the photograph is plotted, and such reduction also promotes increased accuracy: this advantage is particularly great in the case of the plotting of photographs taken with wide-angle lenses.

The invention applies to a photogrammetric plotter accommodating two photographs taken from two different viewpoints, comprising sight marks combined with the photographs and comprising two rods embodying the homologous space image rays, each rod being articulated at a fixed point embodying one of the viewpoints, through the agency of two cardans whose centres coincide with said fixed point.

According to the invention, the two primary axes of the two cardans associated with each rod are supported by a main cradle mounted on the frame of the machine to pivot about a horizontal axis passing through the centre of the cardans and perpendicular to the primary axis of the $x$ first cardan, the primary axis of the second cardan being perpendicular to the primary axis of the first cardan and concurrent with this axis, and the corresponding photograph being disposed in a plane perpendicular to the horizontal pivot axis of the cradle, and means being provided for the rod to produce the relative displacement of the photograph in its plane with respect to the corresponding sight mark.

The invention will now be described with reference to embodiments given by way of example and illustrated in the drawings.

FIG. 1 illustrates a trirectangular reference trihedral $S_1$ xyz, whose axis $S_1$ x coincides with the instrumental base line $S_1$ $S_2$ joining the two centres of rotation $S_1$ and $S_2$ of the rods T, $S_1$ $S_2$ being assumed to be horizontal and $S_1$ z being assumed to be vertical.

The conventional rotations used to pass from the tentatively horizontal photograph (vertical photographing axis) to the real photograph are as follows:

a rotation $\varphi$ (convergence) about $S_1$ y, the trihedral associated with the photograph becomes $S_1$ yx'z'.

followed by a rotation $\omega$ (tilt) about $S_1$ x', bringing $S_1$ z' to $S_1$ z" coinciding with the photographing axis $S_1$ $T_0$.

The trihedral associated with the photograph then becomes $S_1$ x'y'z"; the plane x'y' is parallel to the photograph and the two right-angled axes $S_1$ $x'$ and $S_1$ $y'$ may be selected as respective primary axes of two cardans centered on $S_1$ and controlled by the spatial rotations of the rod T about the fixed point $S_1$.

Figure 3:
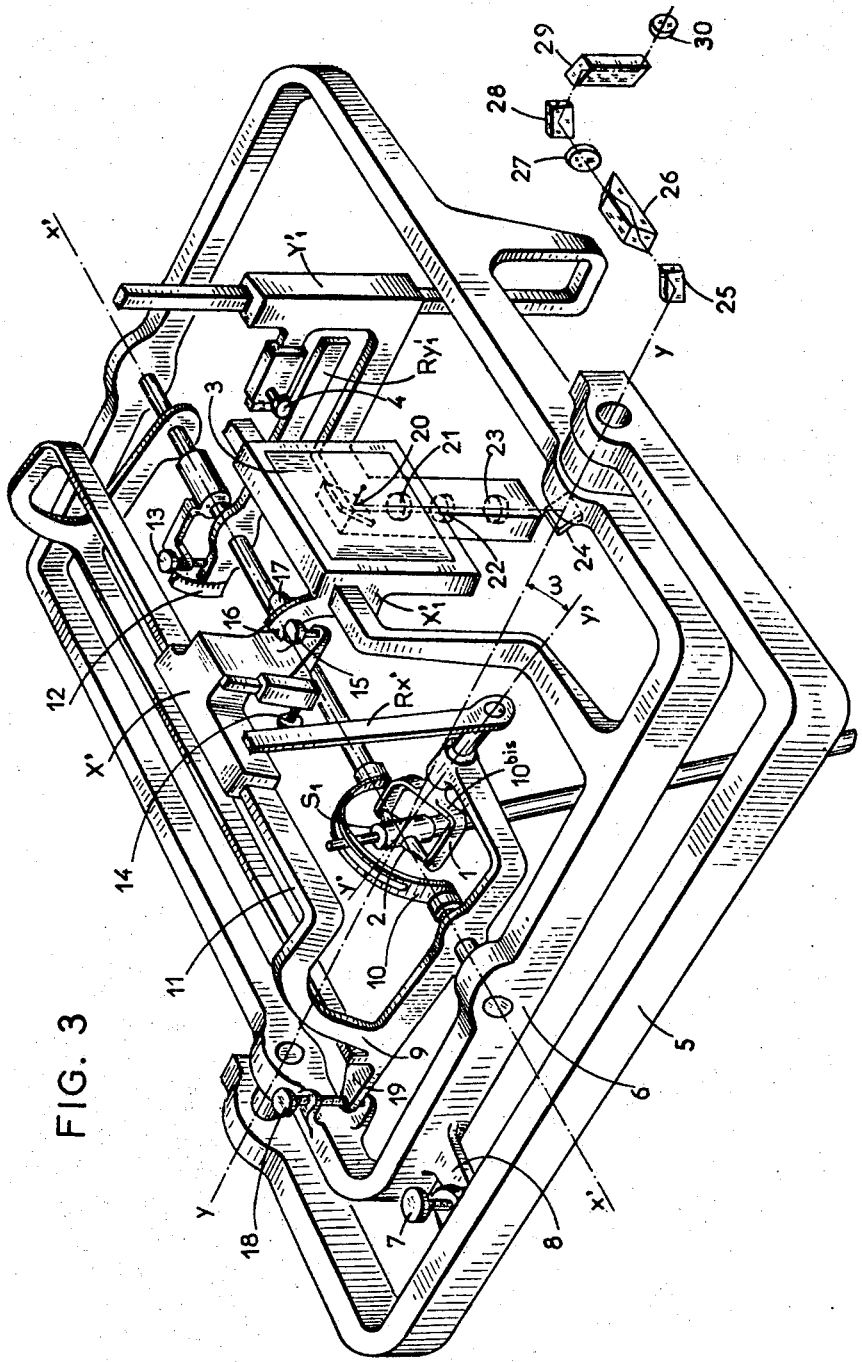
FIG. 3 is a perspective of the rod control of the relative displacement between a photograph and a sight mark, the control by the other rod being symmetrical to that shown.

The axis $y'y'$ bears a fork 1 in which an axis 2 of the second cardan connected to the rod T is pivotally mounted (FIG. 3).

Figure 1:
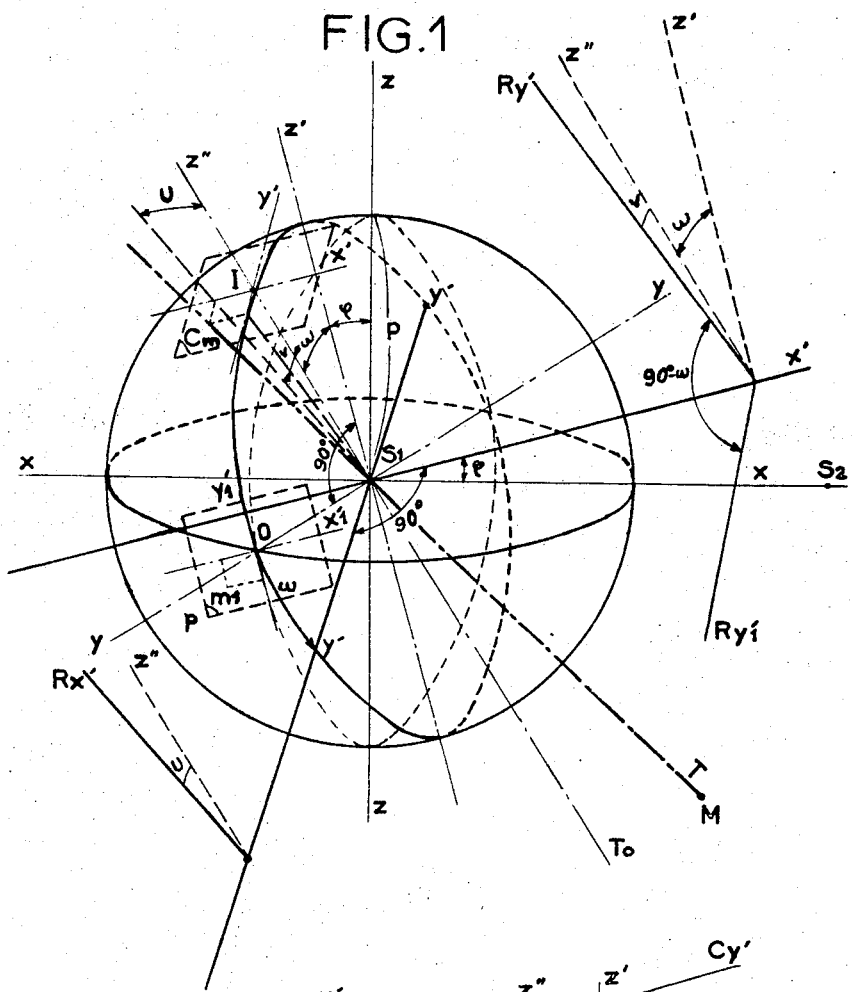
FIG. 1 is a diagrammatic perspective view of right-angled coordinate axes with respect to which the operation of the machine according to the invention will be explained.

With the primary axis $S_1$ $x'$ the rod T (FIG. 1) defines a plane whose inclination to the plane $z''x'$ (angle with $S_1$ $z''$ of the projection of $S_1$ T on the plane $z'y'$) can be marked by bar $Ry'$ secured to the primary axis $S_1$ $x'$ of the cardan. Similarly, the inclination of the plane defined by the rod $S_1$ T and $S_1$ $y'$ can be marked by a bar $Rx'$ normal to the primary axis $S_1$ $y'$ of the cardan and connected to that axis; in other words, the bars $Rx'$ and $Ry'$ embody the projections of the rod $S_1$ T on the two reference planes $S_1$ $x'z''$ and $S_1$ $y'z''$. If $p$ is the main distance of the survey camera, FIG. 1 represents a sphere of radius $p$ centered on $S_1$ C is the plane of the photograph oriented as on taking. It is tangential to the sphere at I (centre of the photograph) and in this plane the coordinates $(x'y')$ of an image point $m$ of the photograph—the intersection of the rod with the plane C—can be reduced to two right-angled axes of origin I and parallel to $S_1$ $x'$ and $S_1 y'$.

In this plane: $x' = p \tan u$
$y' = p \tan v$ $u$ and $v$ being the respective angles of the bars $Rx'$ and $Ry'$ with $S_1 z''$.

When the rod suspended from the cardan about the point $S_1$ assumes any direction $S_1$ $m$ corresponding to the photograph image $m$ of a point M of the terrain, the bars $Rx'$ and $Ry'$ embody the projections of $S_1$ $m$ on the two planes $S_1$ $x'z''$ and $S_1$ $y'z''$.

According to the invention, the photograph is not placed in the plane C but in a plane P which, for example, is normal to the convergence axis of rotation $Sy$ (plane tangential at O to the sphere of the figure and parallel to the plane $S$ $x'z'$). If the coordinates of the same image point $m_1$ are reduced in this plane to two axes $O$ $x'_1$ and $O$ $y'_1$ parallel to the axes $S_1$ $x'$ and $S_1$ $z'$, it will be seen that the passage from the theoretical plane of the photograph C to the plane it occupies on the machine is produced simply by rotation through the angle $90° - \omega$ about $S_1$ $x'$, which brings $S_1$ I to $S_1$ O and $m$ to $m_1$. The image point $m_1$ on the photograph does therefore correspond to a direction $S_1$ $m$ of the rod if the following conditions are satisfied:

The photograph 3 is borne by a carriage $X'_1$ which is displaced with a carriage $X'$ in parallel relationship to the direction $S_1$ $x'$ and is driven by the latter so as to receive the same displacements as the carriage $X'$.

The optical sighting system, which is reduced solely to the head lens and to the sight mark (situated in the plane where the image of the photograph forms across the lens) is borne by a second carriage $Y'_1$ controlled to move in the direction $S_1$ $z'$ and driven by a bar $Ry'_1$ derived from $Ry'$ by rotation through $90° - \omega$ and through the agency of a roller 4 adjustable to the distance $p$ from the plane $S$ $x'z'$ (FIG. 3).

The sighted point $m_1$ of coordinates:

$x'_1 = p \tan u = z'$
$y'_1 = p \tan v = y'$ therefore corresponds to a direction $S_1$ M of the rod, such point therefore being coincident with the point $m$ which would be sighted if the photograph were re-placed in the same position C as it occupied on taking.

Figure 4:
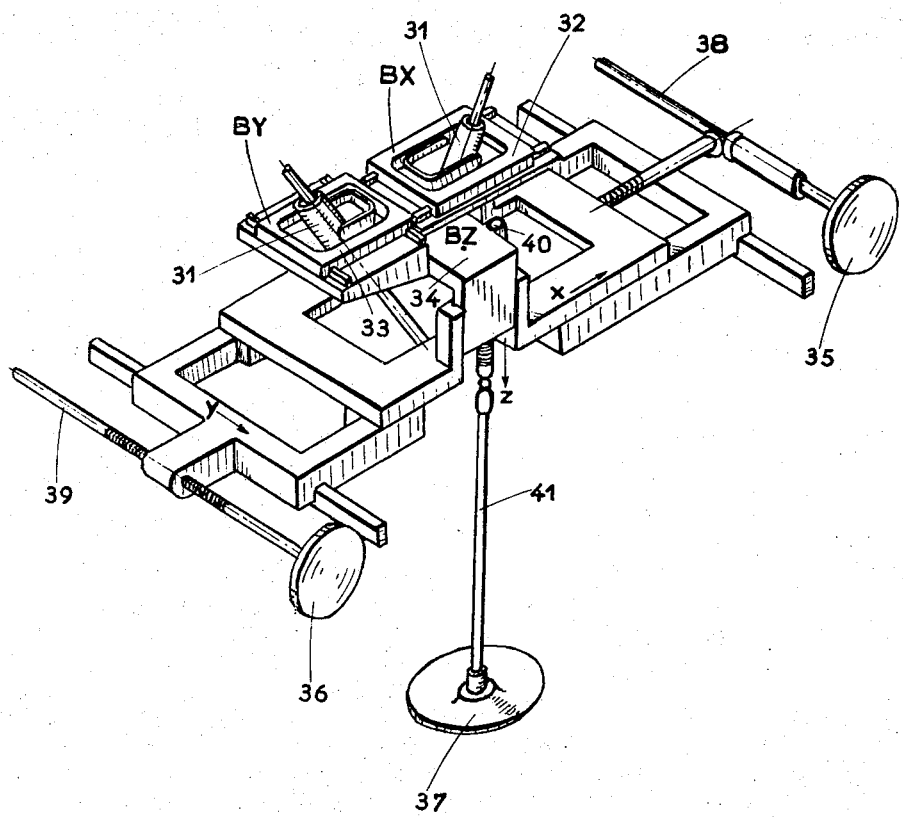
FIG. 4 is a diagrammatic perspective of the part of the machine comprising the control carriages and rods.

FIGS. 3 and 4 show an embodiment of a plotter according to the invention.

Each of the rods is suspended from a fixed point $S_1$ or $S_2$ borne by a frame 5 through the agency of various elements.

A cradle 6 is articulated on the frame about a pivot axis $yy$ and receives the convergence inclinations $\varphi$ of the photograph. The inclinations are adjusted by means of a system comprising a screw 7 and a stop 8.

The cradle 6 bears the pivot axis $x'x'$ of a frame 9 which can be given tilt inclination ($\omega$) about $x'x'$. The axes $x'x'$ and $y'y'$ are perpendicular to one another and intersect at the point $S_1$, the centre of rotation of the rod T.

The axis $x'x'$ is also the primary axis of the first cardan 10 of the rod T.

For a zero convergence, $\varphi = 0$, the axis $x'x'$ coincides with $xx$ joining the two viewpoints $S_1$ $S_2$ (instrumental base).

The cradle 6 bears the tracks for two carriages; a photograph carriage $X'_1$ displaced in the direction $x'x'$, and a carriage $Y'_1$ carrying the optical sighting system (lens and mark) moving in a direction perpendicular to the first carriage and to the pivot axis $yy$ of the cradle 6. The secondary cradle or frame 9 bears a slide guide 11 parallel to $x'x'$ for the carriage $X'$, and the primary axis $y'y'$ of the second cardan, 10 bis, centred on $S_1$ of rod T, $x'x'$ and $y'y'$ being perpendicular to one another and intersecting at $S_1$ $y'y'$ associated with the frame 9, is inclined by the tilt angle $\omega$ of the photograph to the axis $yy$.

The bar $Rx'$ is secured to the primary axis $y'y'$ of the second cardan so as to be coplanar with the axis of the rod ST and the axis $y'y'$.

The bar $Ry'_1$ rotates with the primary axis $x'x'$ of the first cardan through the agency of a plate 12 and a screw stop 13 so that its orientation can be adjusted in dependence on the tilt inclination $\omega$ of the photograph; for zero tilt, the bar is perpendicular to the plane containing $x'x'$ and the axis of the rod $S_1$ T.

The bar $Rx'$ drives the carriage $X'$ through the agency of the roller 14 borne by this carriage, the roller being adjustable thereon by means of a nut and screw system for example in a direction normal to the plane $x'x'—y'y'$ of the frame 9; by such adjustment roller 14 is brought to a distance from the plane $S_1$ $x'y'$ equal to $p$, the main distance of the survey camera. The position can be marked by a millimetre rule and a drum graduated in $\frac{1}{100}$ of a millimetre.

Similarly, bar $Ry'_1$ drives the sight mark carriage $Y'_1$ through the agency of the roller 4 borne by said carriage and adjustable in a direction normal to the plane $S_1$ $x'z$ to bring it to the same distance $p$ from this plane.

Carriage $X'_1$ is driven by carriage $X'$ as follows for example: carriage $X'$ bears a roller 15 whose axis is normal to the primary axis of rotation $S_1$ $x'$ and meets the same. Said roller bears against a plane surface 16 of carriage $X'_1$ perpendicular to the same axis $S_1$ $x'$. A counteracting spring-loaded roller 17 prevents roller 15 from leaving the surface 16; in these conditions the two carriages $X'$ and $X'_1$ receive the same displacements in the direction $x'x'$ irrespective of the tilt inclination $\omega$ of the frame 9 about $x'x'$.

Photograph 3 is disposed on carriage $X'_1$ for examination in a plane normal to the axis $yy$: also, it can receive in its plane in relation to the carriage a rotation about its centre corresponding to the photograph swing.

The inclination of the frame 9 can be adjusted by a screw 18 and a stop 19.

Figure 2:
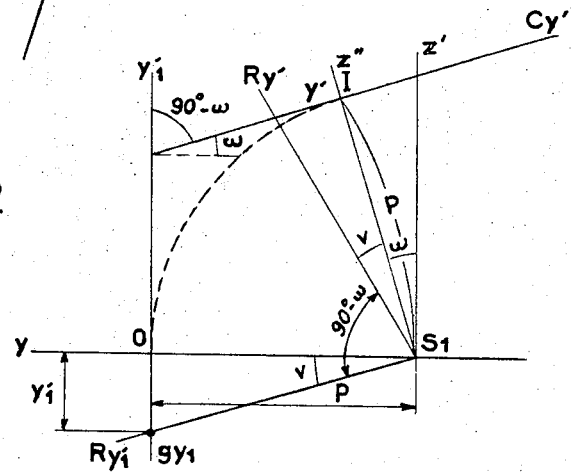
FIG. 2 is a section on $z'$ $S_1$ y in FIG. 1.

The sighting axis defined by the movable head of the viewing system is normal to the photograph and hence parallel to the axis $yy$: also, when the rod assumes the inclination corresponding to the photograph taking axis, the sighted point of the photograph is the centre thereof O. This point has an arbitrary position in the plane of observation of the photograph although it has been selected on the axis $yy$ in FIGS. 1 and 2 to simplify the above explanation.

The viewing system comprises successively from the photograph to the observer:

A mirror 20, a lens 21, a sight mark 22; a first vehicle 23 giving an image of the mark at infinity in the direction $S$ $z'$, this system being borne by carriage $Y'_1$.

A mirror 24 reflecting the sighting axis along the direction $yy$. This mirror can be borne in an arm connected to the cradle 6.

A mirror 25, a Wollaston prism 26 manually pivotable to give correct orientation of the images to the eyepieces, a second vehicle 27, a mirror 28, a parallax corrector 29 and an eyepiece 30.

The mechanisms are identical for the two photographs.

FIG. 4 also shows the other parts of the machine which are not specific to the invention.

At their bottom the rods T slide in sleeves 31 articulated to the cardan on a group of three carriages 32, 33 and 34 embodying the coordinates X, Y and Z of the plotted point M of the terrain. Duplication of the articulations of the rods on the carriage 34 enables base components BX, BY, BZ to be introduced without it being necessary to displace the viewpoints $S_1$ and $S_2$, the rod centres of rotation.

The displacements Y, X, Z of the carriages are controlled by hand wheels 35 and 36 in the case of the first two and a pedal 37 in the case of the third. Output shafts 38 and 39 enable the machine to be coupled to a coordinatograph where the vertical projection of the points and of the level curve are recorded graphically. A meter 40 connected to shaft 41 enables the altitude of the sighted points to be read.

The top frame 5 rests on the table through the agency of adjusting screws for adjustment of the absolute orientation of the model.

The invention is naturally not limited to the details and embodiment described hereinbefore, since they can be modified without thereby departing from the scope of the invention.

For example, the photograph can be initially turned about the axis $xx$, then given a convergence rotation about the axis $yy'$. In such cases, the two photographs are not in one plane but are observed in two fixed planes parallel to one another and perpendicular to the base $S_1 S_2$.

Also, the photograph and optical carriages can be exchanged in relation to the bars $Rx'$ and $Ry'_1$.

In the machine described by way of example with reference to FIGS. 1 to 4 it was assumed that the photograph orientation parameters (tilt, convergence) were introduced on each photograph and that the machine was therefore symmetrical insofar as concerned the mechanical and optical elements.

Such an arrangement is not essential, however, and the machine can be simplified without undergoing any restriction as to application, by appropriate choice and distribution of the parameters to be used for the relative orientation of the photographs.

Thus, the following may be selected as parameters for the relative orientation (formation of the model):

Tilt $\omega$ for one of the photographs

Convergence $\varphi$ for the other photograph

BZ, i.e., vertical displacement of one of the image beams (or of one of the viewpoints S) in relation to the other, by introduction of the corresponding base component BZ of $S_1 S_2$, along the axis of Z (component obtained by displacement on carriage 34 of bottom articulation of one of the rods, right-hand rod in FIG. 4).

The photograph plotting mechanism is greatly simplified:

Elimination of secondary cradles.

Elimination of intermediate carriage X', and direct drive of the photograph and optical carriages $X'_1$ and $Y'_1$ by the bars, Elimination of adjustment of either of the left-hand and right-hand bars $RY'_1$ about its axis for orientation $uu$.

Also, the direct connection between the bars and photograph plotting carriages increases the plotting machine accuracy.

Figure 5:
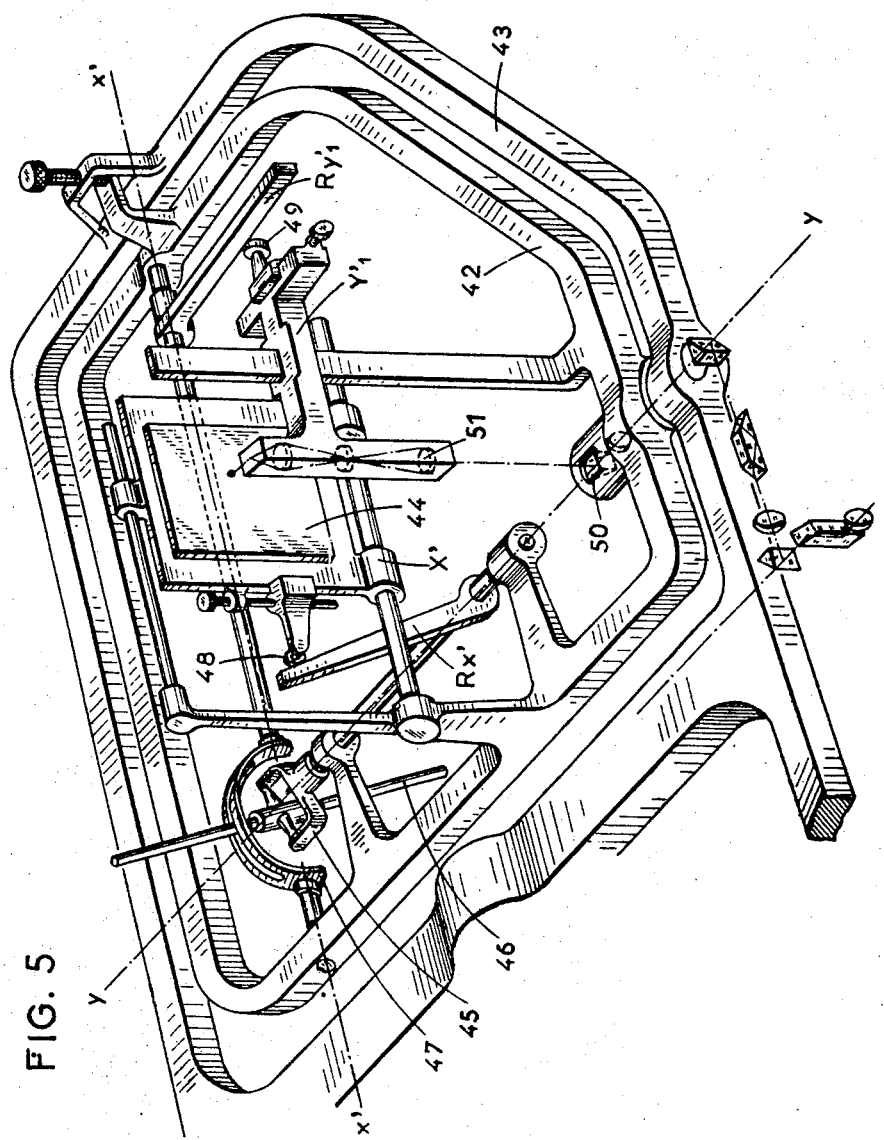
FIGS. 5 and 6 are perspectives of the same part of the machine as shown in FIG. 3, in a variant, these perspectives showing the right-hand and left-hand parts of the machine.
Figure 6:
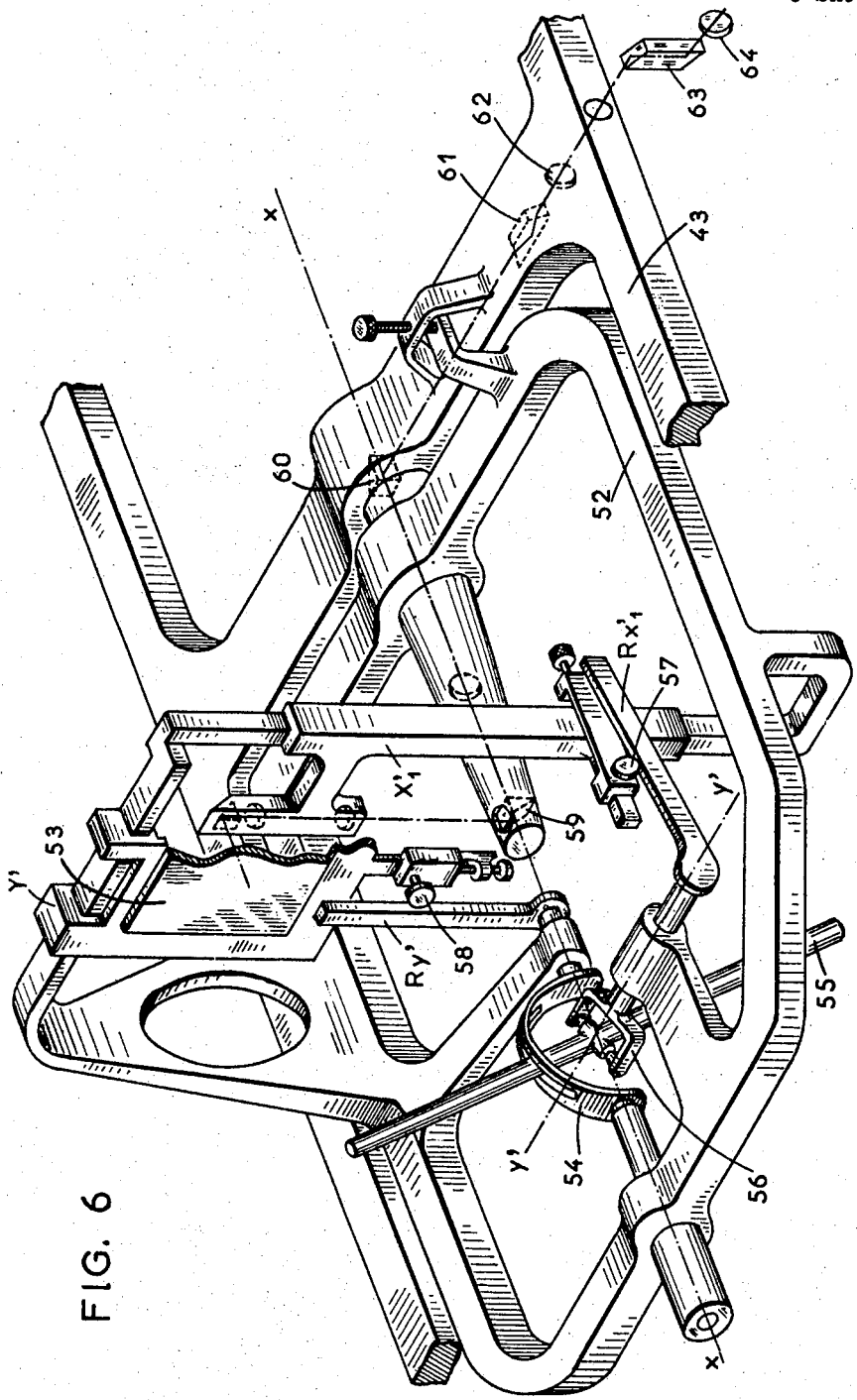

FIGS. 5 and 6 illustrate an embodiment of a photograph plotting mechanism employing the said simplifications.

On the right-hand side of the machine (FIG. 5) the cradle 42 is articulated on the frame 43 through the agency of a pivot axis $yy$ and receives the convergence inclinations $\varphi$ of the photograph 44.

The pivot axis $yy$ is also the primary axis of the second cardan 45 of the rod 46, such axis maintaining a fixed orientation on the frame: the primary axis $x'x'$ of the first cardan 47, perpendicular to the axis $yy$, is borne by cradle 42 and thus receives the inclination $\varphi$.

The cradle 42 bears the tracks of the two carriages, of which the photograph carriage X' moves in the direction $x'x'$ and the optical carriage $Y'_1$ moves in a direction perpendicular to the direction $x'x'$ and to the pivot axis $yy$ of the cradle 42.

The carriage can be swing-oriented by rotation in its plane on the carriage X'.

The bars $Rx'$ and $Ry'_1$ respectively drive these two carriages through rollers 48 and 49 the position of which (adjustment of the main distance) is adjustable as described hereinabove.

The inclined mirror 50 fixed on the cradle 42 receives the beams emerging from the optical part of the viewing system borne by the carriage $Y'_1$ (images of the photograph and sight mark projected to infinity by vehicle 51) and reflects it to the fixed part of the viewing system in the direction $yy$; the rest of the optical system borne by the frame comprises the same elements as in the previous example.

On the left-hand side of the instrument (FIG. 6) the cradle 52 is articulated on the frame 43 through the agency of a pivot axis $xx$ and receives the tilt inclinations $\omega$ of the photograph 53.

The pivot axis $xx$ is also the primary axis of the first cardan 54 of the rod 55, this axis having a fixed orientation on the frame 43. The primary axis of the second cardan 56, perpendicular to the axis $xx$, is borne by the cradle 52 and thus receives the inclination $\omega$.

Since the photograph 53 is preferably examined in a fixed plane, which therefore must not be affected by the corresponding rotation $\omega$ it is required to introduce, the photograph is disposed in a plane normal to the axis of rotation $xx$ of the cradle.

The cradle 52 bears the tracks of two carriages, a photograph carriage Y' and an optical carriage $X'_1$ respectively for plotting the photograph in this plane.

The optical carriage $X'_1$ is displaced vertically (in the absence of any tilt $\omega$), and is driven by the bar $Rx'_1$ secured to the primary axis $y'y'$ of the second cardan so that the bar is perpendicular to the plane of the rod 55 and of the axis $y'y'$.

The photograph carriage Y' moves in a direction perpendicular to carriage $X'_1$ and to the pivot axis $xx$ of the cradle 52, and is driven by the bar RY' secured to the axis $xx$ so as to be in the plane of the corresponding rod and of the axis $xx$. The two rollers 57 and 58 are also provided on this side for adjustment of the main distance. Similarly, the photograph can be swing-oriented on its carriage.

The inclined mirror 59 fixed on the cradle 52 reflects along the axis $xx$ the sighting line defined by the movable part of the optical system borne by carriage $X'_1$. The rest of the optical system borne by the frame 61 comprises the mirror 60, the Wollaston prism 61, the vehicle 62, the rhombus 63 and the eyepiece 64.

The absolute orientation of the model is obtained either by the frame being given the appropriate inclination through the agency of the three adjusting screws on this frame, or simply by adjustment of the inclination of the bottom table bearing the carriages X, Y and Z corresponding to the plotted point, or by the components of the inclination it is required to give the model about the axes X and Y being distributed between the frame and the table.

What I claim is:

1. A photogrammetric plotter comprising two photographs taken from two different viewpoints, sight marks combined with said photographs, two rods embodying the homologous space image rays, each of said rods being articulated at a fixed point embodying one of said viewpoints, a first cardan and a second cardan whose centers coincide with said fixed point for each of said rods mounting the corresponding one of said rods for articulation, a main cradle, the two primary axes of said cardans for each of said rods being supported by said main cradle, a frame for the plotter, said cradle pivoting on said frame about a horizontal axis passing through the center of said cardans and perpendicular to the primary axis of said first cardan, the primary axis of said second cardan being perpendicular to and intersecting the primary axis of said first cardan, the corresponding one of said photographs being supported by and displaceable with respect to said main cradle and being disposed in a plane perpendicular to the horizontal pivot axis of said cradle, means including the respective one of said rods producing relative displacement of said photograph in its plane with respect to the corresponding one of said sight marks, said means comprising two rectilinear perpendicular guide elements on said main cradle respectively guiding the relative displacement of said photograph and said sight mark, carriages mounted on said main cradle for moving said photograph and said sight mark, and bars perpendicular to the primary axes of said cardans and turning with said axes for moving said carriages.

2. A photogrammetric plotter as described in claim 1, said primary axis of said second cardan being supported on said main cradle by a secondary cradle pivotally mounted on said main cradle about a pivot axis coinciding with said primary axis of said first cardan.

3. A photogrammetric plotter as described in claim 1 including adjustment means for orienting said cradle whereby the plane of the primary axes of said cardans is perpendicular to the direction of said rod when said rod coincides with the photographing axis of the corresponding one of said photographs.

4. A photogrammetric plotter as described in claim 1, said two rectilinear guide elements being parallel to the primary axis which is perpendicular to the pivot axis of said main cradle on said frame.

5. A photogrammetric plotter as described in claim 1, said rectilinear guide element for one of said carriages being connected to said secondary cradle and said one of said carriages displacing said photograph with respect to said sight mark through a sliding coupling.

6. A photogrammetric plotter as described in claim 1, each of said bars controlling the corresponding one of said carriages through a contact element and means for adjusting the position of said contact element in relation to the primary axis supporting said bar.

7. A photogrammetric plotter as described in claim 1, said bar turning with the primary axis parallel to said secondary cradle pivot axis including means for adjusting the angle at which said bar is secured on said primary axis.

References Cited

UNITED STATES PATENTS

| | | | |
|---|---|---|---|
| 2,574,123 | 11/1951 | Santoni | 33—20 |
| 2,647,317 | 8/1953 | Poivilliers | 33—20 |
| 2,803,992 | 8/1957 | Baboz | 33—20 X |
| 2,847,906 | 8/1958 | Santoni | 33—20 X |
| 3,170,238 | 2/1965 | Yzerman | 33—20 |

LEONARD FORMAN, *Primary Examiner.*

WILLIAM MARTIN, Jr., *Assistant Examiner.*